(12) United States Patent
Murase et al.

(10) Patent No.: US 7,401,579 B2
(45) Date of Patent: Jul. 22, 2008

(54) VALVE TIMING CONTROL DEVICE

(75) Inventors: Nao Murase, Susono (JP); Hiroki Ichinose, Fujinomiya (JP); Yuuichi Katou, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 109 days.

(21) Appl. No.: 10/589,358

(22) PCT Filed: Feb. 28, 2005

(86) PCT No.: PCT/JP2005/003816

§ 371 (c)(1), (2), (4) Date: Aug. 14, 2006

(87) PCT Pub. No.: WO2005/083249

PCT Pub. Date: Sep. 9, 2005

(65) Prior Publication Data

US 2007/0144470 A1 Jun. 28, 2007

(30) Foreign Application Priority Data

Mar. 2, 2004 (JP) ............................. 2004-058087

(51) Int. Cl.
*F01L 1/34* (2006.01)
(52) U.S. Cl. ................. 123/90.15; 123/90.17; 123/347; 123/403; 123/445; 123/179.18
(58) Field of Classification Search .............. 123/90.15, 123/90.16, 90.17, 90.18, 90.27, 90.31, 345, 123/346, 347, 445, 403, 399, 179.18
See application file for complete search history.

(56) References Cited

U.S. PATENT DOCUMENTS 6,681,741 B2 * 1/2004 Majima et al. ............... 123/399
2003/0213451 A1 11/2003 Aoyama et al.

FOREIGN PATENT DOCUMENTS

| CN | 85 1 03237 A | 10/1986 |
|---|---|---|
| JP | A-05-059936 | 3/1993 |
| JP | A-06-323168 | 11/1994 |
| JP | A-10-252575 | 9/1998 |
| JP | A-2001-254639 | 9/2001 |
| JP | A-2002-047954 | 2/2002 |
| JP | A 2002-129992 | 5/2002 |

(Continued)

*Primary Examiner*—Ching Chang
(74) *Attorney, Agent, or Firm*—Oliff & Berridge, PLC

(57) ABSTRACT

An intake port of an internal combustion engine 10 is provided with a fuel injection valve 22. An intake adjustment mechanism 30 for varying the valve timing of an intake valve 24 and an exhaust adjustment mechanism 32 for varying the valve timing of an exhaust valve 26 are furnished. Immediately after internal combustion engine startup, fuel atomization is facilitated by exercising control so that the valve opening timing for the intake valve 24 coincides with a retarded valve opening timing after exhaust top dead center. In such an instance, the fuel introduced into a cylinder is inhibited from adhering to the exhaust valve 26 and its neighborhood by exercising control in such a manner that the valve closing timing for the exhaust valve 26 coincides with a retarded vale closing timing, which is retarded from a normal valve closing timing.

8 Claims, 8 Drawing Sheets

FOREIGN PATENT DOCUMENTS

| | | |
|---|---|---|
| JP | A-2002-227672 | 8/2002 |
| JP | A-2002-242713 | 8/2002 |
| JP | A-2002-276446 | 9/2002 |
| JP | A 2003-120348 | 4/2003 |
| JP | A-2003-328794 | 11/2003 |

* cited by examiner

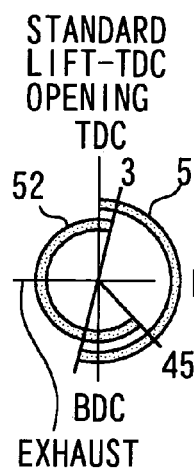
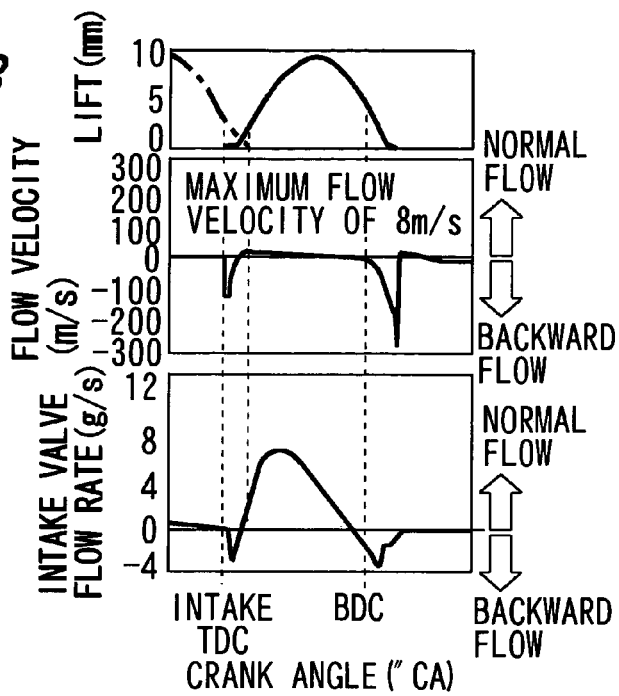
FIG. 2A — STANDARD LIFT-TDC OPENING
FIG. 2B
FIG. 2C
FIG. 2D
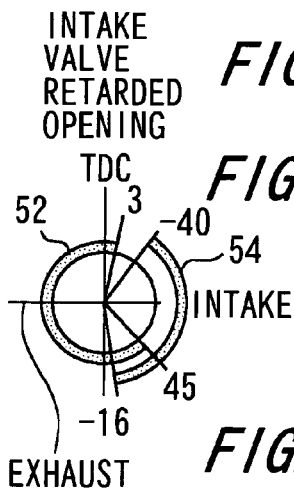
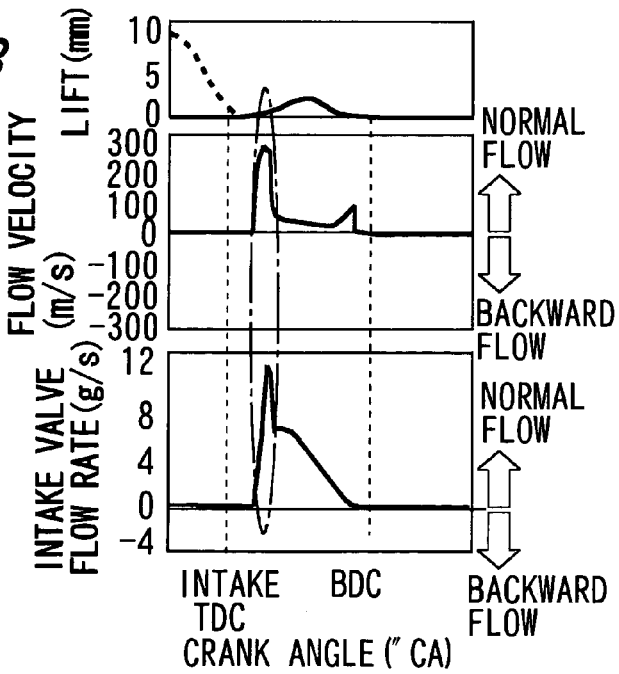
FIG. 3A — INTAKE VALVE RETARDED OPENING
FIG. 3B
FIG. 3C
FIG. 3D FIG. 4
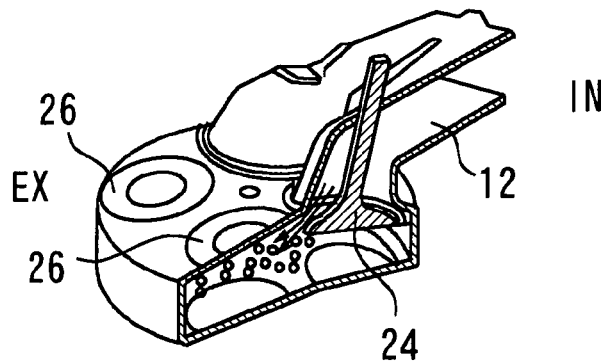
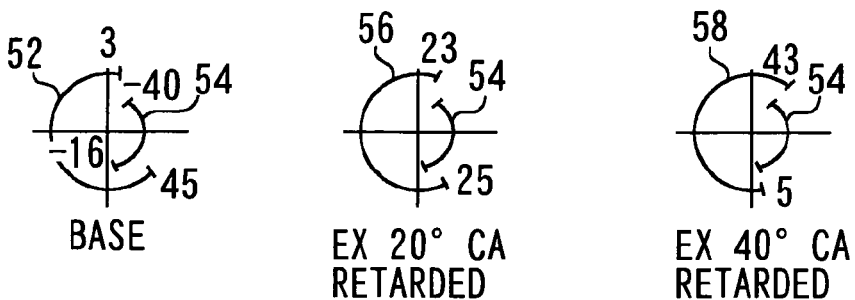
FIG. 5A
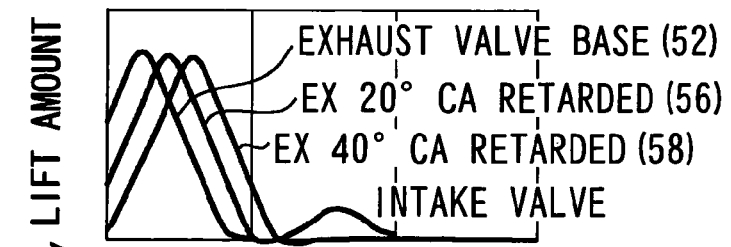
FIG. 5B
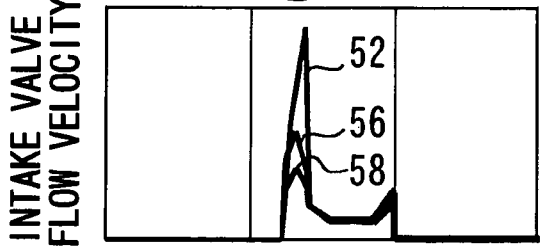
FIG. 5C
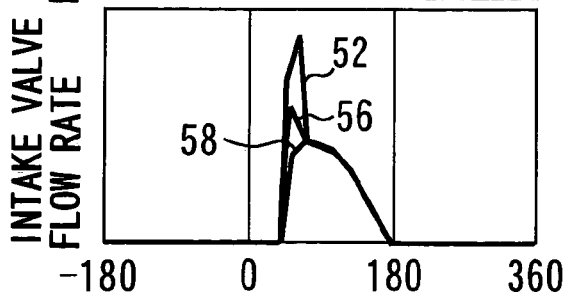
FIG. 5D

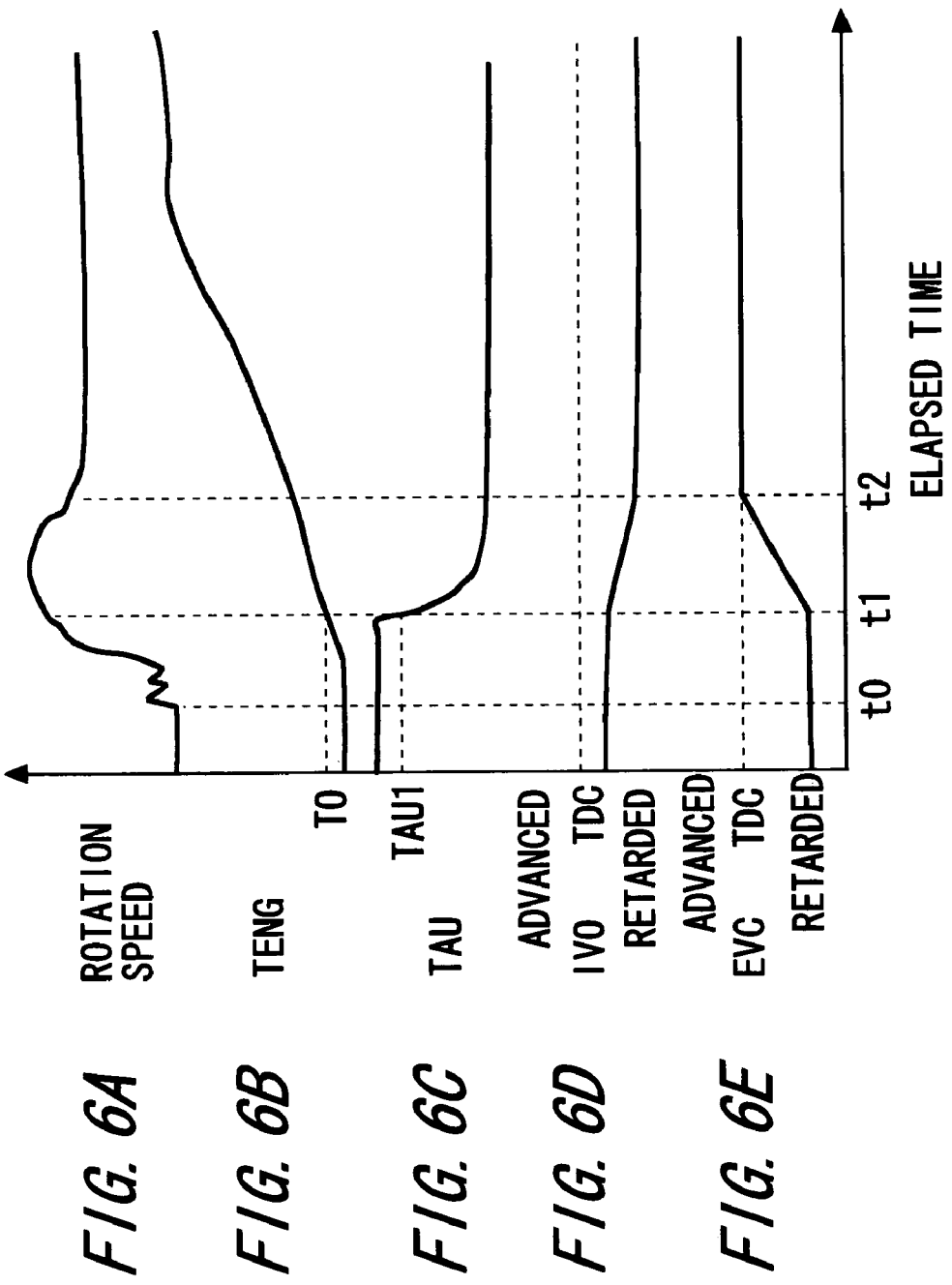

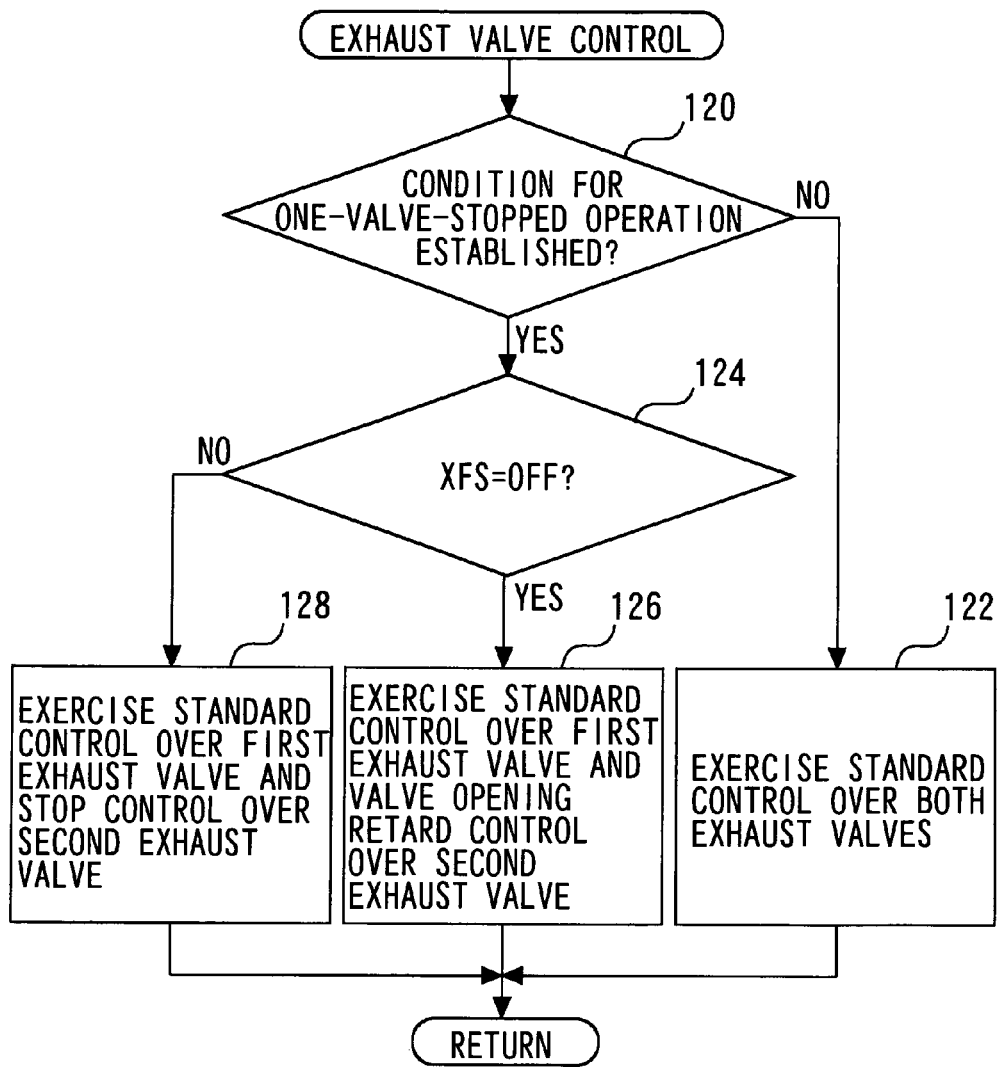

VALVE TIMING CONTROL DEVICE

TECHNICAL FIELD

The present invention relates to a valve timing control device, and more particularly to a valve timing control device that controls the valve timing of an intake valve and exhaust valve for an internal combustion engine.

BACKGROUND ART

A conventionally known device that is disclosed, for instance, by Japanese Patent Laid-Open No. 2002-242713 retards the valve opening timing of the intake valve while the internal combustion engine is cold. When the temperature of the internal combustion engine is within the range of 0 to 50° C., this device selects, for a region retarded from the exhaust top dead center, intake valve opening timing that is retarded from normal valve opening timing.

In a region where the exhaust top dead center is exceeded by a crank angle, the more retarded the intake valve opening timing, the higher the intake flow velocity. Therefore, while the internal combustion engine is cold, the above-mentioned conventional device can provide a higher intake flow velocity than in a normal state. When the intake flow velocity is high, the fuel injected into an intake port is likely to become atomized and unlikely to adhere to the intake port or intake valve.

The more atomized the fuel supplied to the internal combustion engine, the higher the combustion quality. Further, air-fuel ratio control in the internal combustion engine can be accurately exercised when the port wet amount is small. Therefore, the above-mentioned conventional device can enhance the stability of the internal combustion engine and provide increased accuracy in air-fuel ratio control at the time of an internal combustion engine cold start.

The applicant of the present invention has acknowledged that the following documents relate to the present invention including the aforementioned document:

[Patent Document 1]
  Japanese Patent Laid-Open No. 2002-242713

[Patent Document 2]
  Japanese Patent Laid-Open No. 1994-323168

[Patent Document 2]
  Japanese Patent Laid-Open No. 1998-252575

DISCLOSURE OF INVENTION

In the internal combustion engine, however, the fuel injected into the intake port is likely to adhere to the exhaust valve or its neighborhood when the intake flow velocity increases. When the internal combustion engine is warmed to a certain extent, the adherence of the fuel does not constitute a serious problem because the fuel adhering to the neighborhood of the exhaust valve can become vaporized in a cylinder.

However, while the internal combustion engine is sufficiently low, the fuel adhering to the neighborhood of the exhaust valve cannot become vaporized in a cylinder and may be discharged as an exhaust gas during a subsequent exhaust stroke. Therefore, the aforementioned conventional device is likely to deteriorate the exhaust emission immediately after internal combustion startup.

The present invention has been made to solve the above problem. It is an object of the present invention to provide a valve timing control device that is capable of exhibiting an excellent emission characteristic immediately after internal combustion engine startup while atomizing the fuel by making use of intake flow velocity during an internal combustion engine warm-up process.

The first aspect of the present invention is a valve timing control device comprising:

a fuel injection valve for injecting fuel into an intake port in an internal combustion engine;

an intake speed adjustment mechanism for varying the speed of an intake inflow from the intake port to a cylinder;

an exhaust adjustment mechanism for varying the valve timing of an exhaust valve;

intake speed increase means for exercising control so as to place the intake speed adjustment mechanism in a high-speed state for raising the speed of an intake inflow; and exhaust valve closing timing retard control means for exercising control so that an exhaust valve closing timing coincides with a retarded valve closing timing, which is retarded from a normal valve closing timing, in a situation where the intake speed adjustment mechanism is maintained in the high-speed state.

The second aspect of the present invention is the valve timing control device according to the first aspect, wherein the intake speed increase means exercises control so as to place the intake speed adjustment mechanism in the high-speed state in a situation where the internal combustion is not completely warmed up;

wherein the normal valve closing timing is an exhaust valve closing timing that is normally used after the internal combustion engine is warmed up; and wherein the exhaust valve closing timing retard control means exercises control so that the exhaust valve closing timing coincides with the retarded valve closing timing in a situation where the internal combustion engine is not completely warmed up and the intake speed adjustment mechanism is maintained in the high-speed state.

The third aspect of the present invention is the valve timing control device according to the first or second aspect, wherein the intake speed adjustment mechanism includes an intake adjustment mechanism for varying the valve timing of an intake valve; and wherein the intake speed increase means includes intake valve opening timing retard control means, which raises the speed of an intake inflow by exercising control so that an intake valve opening timing coincides with a retarded valve opening timing after an exhaust top dead center.

The fourth aspect of the present invention is the valve timing control device according to any one of the first to third aspects, wherein the intake speed adjustment mechanism includes an intake adjustment mechanism for varying the lift amount for the intake valve; and wherein the intake speed increase means includes intake lift amount control means, which raises the speed of an intake inflow by reducing the lift amount for the intake valve.

The fifth aspects of the present invention is the valve timing control device according to any one of the first to fourth aspects, wherein the intake speed increase means includes high-speed state setup means, which varies the high-speed state so as to increase the speed of an intake inflow when a warm-up process for the internal combustion engine progresses.

The sixth aspects of the present invention is the valve timing control device according to the first to fifth aspects, further comprising:

retarded valve closing timing setup means, which varies the retarded valve closing timing in advancing direction when the warm-up process for the internal combustion engine progresses.

The seventh aspects of the present invention is the valve timing control device according to any one of the first to sixth aspects, wherein the retarded valve opening timing and the retarded valve closing timing are such that an overlap is generated between intake valve opening period and exhaust valve opening period.

The eighth aspects of the present invention is the valve timing control device according to any one of the first to fourth aspects, wherein the internal combustion engine includes a plurality of exhaust valves for each cylinder; and wherein the exhaust adjustment mechanism has a function for adjusting the valve timings of the plurality of exhaust valves for each cylinder on an individual basis, said valve timing control device comprising:

partial stop request judgment means for judging whether a request for stopping some of the plurality of exhaust valves is generated, and exhaust valve control means, which, when the stop request is recognized in a situation where the intake speed adjustment mechanism is maintained in the high-speed state, operates all the exhaust valves while ensuring that the valve opening timings for some exhaust valves are retarded from the valve opening timings for the other exhaust valves.

According to the first aspect of the present invention, the intake speed adjustment mechanism can be placed in the high-speed state to increase the velocity of the intake flow into a cylinder and facilitate the atomization of the fuel injected into the intake port. Further, when the high-speed state prevails, the first aspect of the present invention can provide retarded valve closing timing for the exhaust valve. When retarded valve closing timing is provided for the exhaust valve, the in-cylinder negative pressure prevailing while the intake valve is open can be shifted toward the atmospheric pressure side. Consequently, a momentary intake flow velocity prevailing while the intake valve is open can be restrained. As a result, the amount of fuel adhesion to the neighborhood of the exhaust valve is reduced to improve the emission characteristic.

When the internal combustion engine is not completely warmed up, the second aspect of the present invention can increase the intake flow velocity to facilitate the atomization of the fuel and retard the exhaust valve closing timing to reduce the amount of fuel adhesion to the neighborhood of the exhaust valve. When warm-up is completed so that the fuel exhibits good combustion quality, a stable operating state can be maintained by providing normal valve closing timing for the exhaust valve.

The third aspect of the present invention can change the status of the intake adjustment mechanism to provide the intake valve with valve opening timing that is retarded from the exhaust top dead center. In a region subsequent to the exhaust stop dead center, the in-cylinder pressure prevailing when the intake valve is open becomes negative to increase the intake flow velocity when the intake valve opening timing is retarded. Therefore, the third aspect of the present invention can properly increase the intake flow velocity.

The fourth aspect of the present invention can vary the intake valve lift amount by changing the status of the intake adjustment mechanism. The smaller the intake valve lift amount, the higher the intake flow velocity. Therefore, the fourth aspect of the present invention can properly increase the intake flow velocity.

The fifth aspect of the present invention can increase the intake flow velocity when internal combustion engine warm-up progresses. Therefore, the fifth aspect of the present invention can facilitate the atomization of the fuel in accordance with the progress in a warm-up process. Meanwhile, the fuel adhering to the neighborhood of the exhaust valve does not affect the emission when the warm-up process progresses. Therefore, the fifth aspect of the present invention can provide a good operating state without deteriorating the emission during the internal combustion engine warm-up process.

When the warm-up process progresses, the sixth aspect of the present invention can advance the retarded valve closing timing, that is, the exhaust valve closing timing, thereby increasing the intake flow velocity. Therefore, the sixth aspect of the present invention can facilitate the atomization of the fuel in accordance with the progress in the warm-up process. Meanwhile, the fuel adhering to the neighborhood of the exhaust valve does not affect the emission when the warm-up process progresses. Therefore, the sixth aspect of the present invention can provide a good operating state without deteriorating the emission during the internal combustion engine warm-up process.

The seventh aspect of the present invention can provide an overlap between intake valve opening period and exhaust valve opening period at least immediately after internal combustion engine startup. If a valve overlap is generated in a region retarded from the exhaust top dead center, the intake valve opens while the exhaust gas flows backward from the exhaust path to the interior of a cylinder. In this instance, the adhesion of fuel to the neighborhood of the exhaust valve can be sufficiently restrained by the backward flow of the exhaust gas.

If a request for stopping a specific exhaust valve is generated while the intake speed adjustment mechanism is maintained in the high-speed state, the eighth aspect of the present invention can operate the exhaust valve designated by the request with the valve opening timing retarded. When the exhaust valve opening timing is retarded, the exhaust gas flow from the exhaust valve is restrained. Therefore, the resulting effect is similar to the effect produced when the exhaust valve is stopped. If all the exhaust valves are operated, the intake flow velocity prevailing when the intake valve is open can be restrained to let a smaller amount of fuel adhere to the neighborhood of each exhaust valve than when a specific exhaust valve is stopped. In a situation where the request for stopping a specific exhaust valve is generated, therefore, the eighth aspect of the present invention can effectively prevent the emission from deteriorating while producing a desired effect.

BRIEF DESCRIPTION OF DRAWINGS

FIGS. 2A to 2D outline an intake valve standard opening control operation that is performed by a system according to the first embodiment of the present invention.

FIGS. 3A to 3D outline an intake valve retarded opening control operation that is performed by the system according to the first embodiment of the present invention.

FIG. 4 shows that fuel is taken into a cylinder via an intake port immediately after an intake valve is opened under intake valve retarded opening control.

FIGS. 5A to 5D illustrate the principle of a method that the first embodiment of the present invention uses to prevent the emission characteristic from deteriorating due to intake valve retarded opening control.

FIGS. 6A to 6E are timing diagrams illustrating a typical operation that the system according to the first embodiment of the present invention performs after internal combustion engine startup.

FIG. 10 is a flowchart illustrating a routine that the second embodiment of the present invention executes to change an exhaust valve operating method.

BEST MODE FOR CARRYING OUT THE INVENTION

First Embodiment

[Configuration of a First Embodiment]

Figure 1:
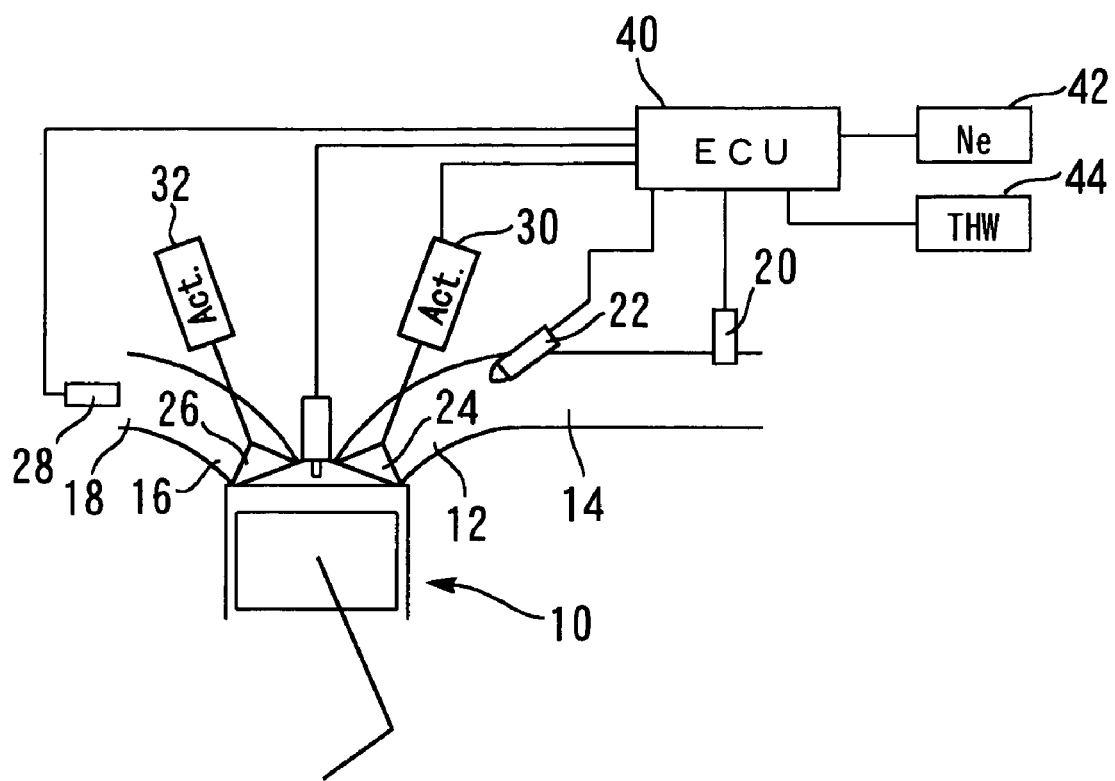
FIG. 1 illustrates the configuration of a first embodiment of the present invention.

FIG. 1 illustrates the configuration of a first embodiment of the present invention. A system according to the first embodiment includes an internal combustion engine 10. The internal combustion engine 10 includes a plurality of cylinders. One of the plurality of the cylinders is shown in FIG. 1. Each cylinder communicates with an intake path 14 via an intake port 12 and communicates with an exhaust path 18 via an exhaust port 16.

The intake path 14 is provided with an air flow meter 20 for detecting an intake air amount Ga. The intake port 12 is provided with a fuel injection valve 22 for injecting fuel into the intake port 12. Each cylinder has two intake valves 24 (only one of them is shown in FIG. 1). When the intake valves 24 open or close, the interior of the cylinder is connected to or disconnected from the intake port 12.

Each cylinder also has two exhaust valves 26. When the exhaust valves 26 open or close, the interior of the cylinder is connected to or disconnected from the exhaust port 16. The exhaust path 18 is provided with an air-fuel ratio sensor 28, which generates an output according to the exhaust air-fuel ratio.

The intake valve 24 and the exhaust valve 26 are coupled to an intake adjustment mechanism 30 and an exhaust adjustment mechanism 32, respectively. The intake adjustment mechanism 30 and exhaust adjustment mechanism 32 are provided for each valve disc. These mechanisms can independently open/close the two intake valves 24 and two exhaust valves 26, which are provided for each cylinder. More specifically, the intake adjustment mechanism 30 and exhaust adjustment mechanism 32 are implemented, for instance, by solenoid actuators that are capable of opening/closing the valve disc with electromagnetic force. These mechanisms can freely change the lift amount, operating angle, and valve timing (opening/closing timing) of the respective intake valves 24 and the lift amount, operating angle, and valve timing (opening/closing timing) of the respective exhaust valves 26 without regard to the valve opening characteristics of the other valve discs.

The system according to the present embodiment includes an ECU (Electronic Control Unit) 40. The ECU 40 is connected, for instance, to the aforementioned air flow meter 20 and air-fuel ratio sensor 28 as well as a rotation speed sensor 42 for detecting the engine speed Ne and a water temperature sensor 44 for detecting the cooling water temperature THW. The ECU 40 is capable of controlling actuators, such as the fuel injection valve 22, intake adjustment mechanism 30, and exhaust adjustment mechanism 32, in accordance with outputs generated by the above-mentioned sensors.

[Operation Performed by the First Embodiment]

(Intake Valve Standard Opening Control)

The system according to the present embodiment can selectively exercise "intake valve standard opening control" and "intake valve retarded opening control" in accordance with the operating state of the internal combustion engine 10. "Intake valve standard opening control" is exercised to open the intake valve 24 with standard timing. "Intake valve retarded opening control" is exercised to open the intake valve 24 with retarded timing, which is retarded from the standard timing. First of all, "intake valve standard opening control" will be outlined with reference to FIGS. 2A to 2D.

FIG. 2A simultaneously shows a standard valve opening period 50 of the intake valve 24 and a standard valve opening period 52 of the exhaust valve 26, which are provided by intake valve standard opening control. As indicated in this figure, the exhaust valve 26 for the internal combustion engine 10 normally opens at approximately 45° CA (Crank Angle) before exhaust bottom dead center (BDC) and then closes at approximately 3° CA after exhaust top dead center (TDC). While standard opening control is exercised, the intake valve 24 opens near exhaust top dead center and closes at several degrees CA after intake bottom dead center.

The curve indicated by a one-dot chain line in FIG. 2B is a lift curve that corresponds to the aforementioned period 52 of the exhaust valve 26. On the other hand, the curve indicated by a solid line in the same figure is a lift curve that corresponds to the aforementioned standard valve opening period 50 of the intake valve 24. FIGS. 2C and 2D respectively show the intake air flow velocity and the flow rate of gas passage through the intake valve 24 that prevail when the intake valve 24 and exhaust valve 26 are lifted as indicated in FIG. 2B.

FIGS. 2C and 2D indicate a negative flow velocity and negative flow rate that prevail immediately after the opening of the intake valve 24 and immediately after intake BDC. The negative flow velocity represents a phenomenon in which a burned gas flows backward from the exhaust port 16 to the intake port 12 during a valve overlap. On the other hand, the negative flow rate represents a phenomenon in which the gas taken into a cylinder flows backward to the intake port 12 when the in-cylinder volume decreases after intake BDC.

The waveform shown in FIG. 2D indicates that the rate of gas flow into a cylinder through the intake valve 24 gradually increases/decreases in accordance with an increase/decrease in the opening of the intake valve 24 when the intake valve 24 and exhaust valve 26 move along the standard lift curves. Further, the waveform shown in FIG. 2C indicates that the velocity of the gas flow into the cylinder is not unduly high throughout the entire valve opening period of the intake valve 24 under such operating conditions.

(Intake Valve Retarded Opening Control)

"Intake valve retarded opening control" will now be outlined with reference to FIGS. 3A to 3D. FIG. 3A simultaneously show a retarded valve opening period 54 of the intake valve 24 and the standard valve opening period 52 of the exhaust valve 26, which are provided by intake valve retarded opening control. While intake valve retarded opening control is exercised, the intake valve 24 remains closed until the crank angle is approximately 40° CA after exhaust top dead center, and then remains open until the crank angle is approximately 16° CA before intake bottom dead center, as indicated in this figure.

The curve indicated by a one-dot chain line in FIG. 3B is a lift curve of the exhaust valve that corresponds to the standard valve opening period 52. The curve indicated by a solid line in the same figure is a lift curve that corresponds to the aforementioned retarded valve opening period 54 of the intake valve 24. When the retarded valve opening period 54 is to be provided for the intake valve 24 in this instance, the lift amount for the intake valve 24 is reduced.

FIGS. 3C and 3D respectively show the intake air flow velocity and the flow rate of gas passage through the intake valve 24 that prevail when the intake valve 24 and exhaust valve 26 operate as indicated in FIGS. 3A and 3B. When such operations are performed, the exhaust valve 26 closes after the exhaust TDC is exceeded by the crank angle. The interior of the cylinder is then isolated from both the intake port 12 and exhaust port 16 until the intake valve 24 opens. Therefore, a negative pressure is produced in the cylinder at the time when the intake valve 24 opens.

The amount of a volume change in the in-cylinder space per unit time (hereinafter referred to as the "volume change rate") is minimized when the crank angle exceeds the top dead center or bottom dead center and maximized when the crank angle is midway between the top dead center and bottom dead center. When intake valve standard opening control is exercised, the intake valve 24 opens near the TDC. However, when intake valve retarded opening control is exercised, the intake valve 24 opens at 40° CA after TDC at which the in-cylinder volume change rate becomes higher. Therefore, when intake valve retarded opening control is exercised, the intake valve 24 opens in a situation where the in-cylinder volume increases at a higher rate than when intake valve standard opening control is exercised.

For the above reasons, the velocity and rate of an air flow into the cylinder temporarily become extremely high when the intake valve 24 opens in a situation where intake valve retarded opening control is exercised (see the region enclosed by a one-dot chain line in FIGS. 3B to 3D). Fuel injection into the intake port 12 occurs before the intake valve 24 opens. The injected fuel is taken into the cylinder together with air after the intake valve 24 is opened. In this instance, the fuel is atomized and likely to burn when the air flow velocity is high. Consequently, intake valve retarded opening control, which momentarily invokes a high flow velocity, is suitable for facilitating the atomization of fuel to enhance its combustion quality.

Meanwhile, intake valve standard opening control does not produce a great negative pressure within the cylinder. Thus, intake valve standard opening control is more advantageous than intake valve retarded opening control in that the former can restrain the pumping loss. Therefore, enhanced warm-up operation stability and excellent fuel efficiency can be both obtained if, for instance, intake valve retarded opening control is exercised during a warm-up process during which the fuel cannot readily be atomized, and intake valve standard opening control is exercised after the internal combustion engine is sufficiently warmed up.

(Problem with Intake Valve Retarded Opening Control)

As described above, intake valve retarded opening control is effective particularly for stabilizing the operation of the internal combustion engine while it is being warmed up. However, intake valve retarded opening control is likely to deteriorate the emission characteristic in a situation where the internal combustion engine temperature is sufficiently low.

FIG. 4 illustrates the reason why the above property arises. More specifically, FIG. 4 shows that fuel is taken into the cylinder from the intake port 12 immediately after the intake valve 24 is opened under intake valve retarded opening control. While intake valve retarded opening control is exercised, the velocity of the flow into the cylinder temporarily reaches a sufficiently high level when the intake valve 24 opens, as described above. As a result, part of the fuel injected into the intake port 12 vigorously reaches the neighborhood of the exhaust valve 26 and adheres to the exhaust valve 26 and its neighborhood in the form of droplets as indicated in FIG. 4.

At a stage where internal combustion engine warm-up has progressed to a certain extent, the attached fuel vaporizes when the intake stroke and compression stroke progress later. Therefore, the fuel does not seriously affect the emission. In a situation where the internal combustion engine temperature is sufficiently low, however, the fuel attached to the exhaust valve 26 and its neighborhood cannot sufficiently vaporize, and is discharged together with a burned gas during a subsequent exhaust stroke. In such an instance, unburned HC mixes into the exhaust gas so that the emission characteristic is likely to deteriorate.

(Principle of Emission Characteristic Improvement)

FIGS. 5A to 5D illustrate the principle of a method that the present embodiment uses to prevent the emission characteristic from deteriorating due to intake valve retarded opening control. More specifically, FIG. 5A indicates the retarded valve opening period 54 of the intake valve 24 in comparison with the standard valve opening period 52 of the exhaust valve 26 (left), a 20° CA retarded valve opening period 56 of the exhaust valve 26 (center), and a 40° CA retarded valve opening period 58 of the exhaust valve 26 (right). FIGS. 5B, 5C, and 5D respectively show the lift amounts for the intake valve 24 and exhaust valve 26, the flow velocities of gas passage through the intake valve 24, and the flow rates of gas passage through the intake valve 24 in correspondence with the valve opening periods shown in FIG. 5A.

According to the 20° CA retarded valve opening period 56, the exhaust valve 26 remains open until the crank angle is approximately 23° CA after exhaust TDC. According to the 40° CA retarded valve opening period 58, the exhaust valve 26 remains open until the crank angle is approximately 43° CA after exhaust TDC. While the exhaust valve 26 is open, the pressure within the cylinder does not become negative. Therefore, the in-cylinder negative pressure produced at the beginning of the retarded valve opening period 54, that is, when the intake valve 24 opens (40° CA after TDC), decreases (to become close to the atmospheric pressure) with an increase in the retarding degree of exhaust valve opening period. Consequently, the flow velocity and flow rate of gas passage through an open intake valve 24 are minimized when the valve opening period of the exhaust valve 26 coincides with the 40° CA retarded valve opening period 58.

If the flow velocity produced when the intake valve 24 opens decreases, the fuel flowing inward from the intake port 12 does not readily reach the neighborhood of the exhaust valve 26. This reduces the amount of fuel that adheres to the exhaust valve 26 and its neighborhood. Therefore, the 40° CA retarded valve opening period 58 is suitable for preventing the emission characteristic from deteriorating when intake valve retarded opening control is exercised in a low-temperature environment.

According to the 40° CA retarded valve opening period 58, the period between 40° CA after TDC and 43° CA after TDC can be used as an overlap period during which the exhaust valve 26 and intake valve 24 are both open. In other words, the 40° CA retarded valve opening period 58 is such that the exhaust valve 26 can be opened at the time when the intake valve 24 opens to flow fuel into the cylinder. If the exhaust valve 26 is open within a region after TDC, a gas flow toward the interior of the cylinder arises around the exhaust valve 26. Such a gas flow works so that the fuel inflow from the intake port 12 is inhibited from reaching the exhaust valve 26 and its neighborhood. In this respect, too, the 40° CA retarded valve opening period 58 is suitable for reducing the amount of fuel adhesion to the neighborhood of the exhaust valve 26 and improving the emission characteristic.

As described above, the emission characteristic prevailing when intake valve retarded opening control is exercised in a low-temperature environment can be improved by retarding the valve opening timing of the exhaust valve 26. A valve overlap is generated when the valve opening timing of the exhaust valve 26 is retarded. The emission characteristic can be further improved by such a valve overlap. The system according to the present embodiment makes use of the above principle to prevent the emission characteristic from deteriorating due to intake valve retarded opening control.

(Details of a Typical Operation)

FIGS. 6A to 6E are timing diagrams illustrating the details of a typical operation that is performed after the internal combustion engine 10 is started up. More specifically, FIG. 6A shows how the engine speed Ne changes; FIG. 6B shows how the engine temperature Teng (the same as the cooling water temperature THW) changes; and FIG. 6C shows how the fuel injection amount TAU changes. FIGS. 6D and 6E respectively show changes in the intake valve opening timing IVO and changes in the exhaust valve closing timing EVC.

In the example shown in FIGS. 6A to 6E, the internal combustion engine 10 is started at time t0 while the engine temperature Teng is lower than a cold judgment temperature $T_0$. In this instance, a startup correction is made for amount increase so that the fuel injection amount TAU is larger than a cold judgment amount TAU1. Here, it is assumed that the amount of correction provided by a startup amount increase decreases with an increase in the engine temperature Teng, and that the TAU prevailing during an idle state decreases to the TAU1 when Teng=$T_0$.

When the engine temperature Teng is lower than the cold judgment temperature $T_0$, the system according to the present embodiment sets the intake valve opening timing IVO to an initial value for the retarded valve opening timing (e.g., 30° CA after TDC) and the exhaust valve closing timing EVC to an initial value for the retarded valve closing timing (e.g., 43° CA after TDC). The initial value for the retarded valve opening timing is retarded from the valve opening timing IVO that is used under intake valve standard opening control. Therefore, the use of such a valve opening timing IVO makes it possible to facilitate the atomization of fuel that flows from the intake port 12 into the cylinder, and stabilize the internal combustion engine operation in a low-temperature environment. The initial value for the retarded valve closing timing is sufficiently retarded from the TDC and generates a valve overlap for the aforementioned valve opening timing IVO. Therefore, the use of such a valve closing timing EVC makes it possible to sufficiently reduce the amount of fuel adhesion to the exhaust valve 26 and its neighborhood, and maintain an excellent emission characteristic at the time of a cold start.

In the example shown in FIGS. 6A to 6E, the engine temperature Teng reaches the cold judgment temperature $T_0$ at time t1. As a result, the fuel injection amount TAU prevailing during an idle state is decreased to the cold judgment amount TAU1. When the internal combustion engine 10 is warmed to such an extent, the system according to the present embodiment further facilitates the atomization of fuel by applying changes to ensure that the intake valve opening timing IVO is retarded from the aforementioned retarded valve opening timing (30° CA after TDC) and that the exhaust valve closing timing EVC is advanced from the aforementioned retarded valve closing timing (43° CA after TDC).

The intake valve opening timing IVO is gradually retarded until it reaches a convergence value for the retarded valve opening timing (e.g., 40° CA after TDC). On the other hand, the exhaust valve closing timing EVC is gradually advanced until it reaches a convergence value for the retarded valve closing timing (e.g., TDC). In other words, the valve opening period for the intake valve 24 is gradually retarded until it coincides with the aforementioned retarded valve opening period 54, and the valve opening period for the exhaust valve 26 is gradually advanced until it coincides with the aforementioned standard valve opening period 52 (see FIG. 3A).

In the example shown in FIGS. 6A to 6E, the intake valve opening timing IVO and exhaust valve closing timing EVC respectively reach their convergence values at time t2. The flow velocity prevailing when the intake valve 24 is open is likely to increase when the retarded valve opening timing for the intake valve 24 and the retarded valve closing timing for the exhaust valve 26 change as described above. Therefore, the rate of fuel inflow to the cylinder gradually increases between time t1 and time t2.

Fuel atomization is facilitated to a greater extent when the rate of fuel inflow increases. On the other hand, when the rate of fuel inflow increases, the incoming fuel is likely to reach the neighborhood of the exhaust valve 26. At this stage, however, the amount of an increase in the fuel injection amount TAU for correction purposes begins to decrease. Therefore, the amount of fuel inflow to the cylinder is smaller than immediately after startup. Further, the engine temperature Teng is raised to a certain extent at this stage. Therefore, even if the rate of fuel inflow is increased, a large amount of fuel, which cannot completely vaporize, does not reach the neighborhood of the exhaust valve 26, and the emission characteristic does not deteriorate due to the increase in the rate of fuel inflow.

As far as intake valve retarded opening control is continuously exercised after time t2, the intake adjustment mechanism 30 and exhaust adjustment mechanism 32 are driven to ensure that the valve opening period for the intake valve 24 coincides with the retarded valve opening period 54, and that the valve opening period for the exhaust valve 26 coincides with the standard valve opening period 52. As a result, an excellent emission characteristic and stable internal combustion engine operation are both obtained.

[Details of a Process According to the First Embodiment]

Figure 7:
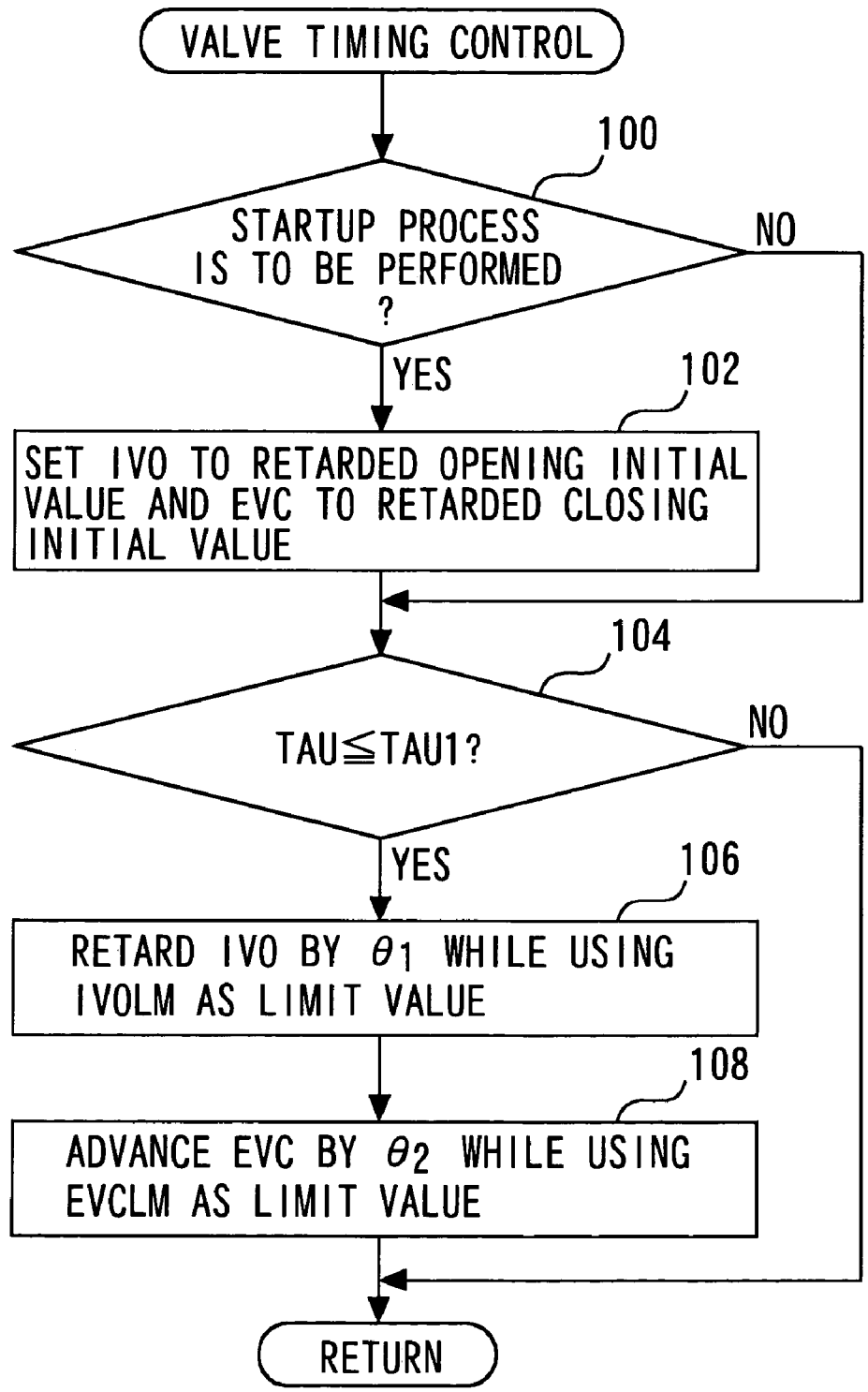
FIG. 7 is a flowchart illustrating a routine that is executed by the first embodiment of the present invention.

FIG. 7 is a flowchart illustrating a routine that the ECU 40 according to the present embodiment executes to implement the above functionality. It is assumed that this routine is started at internal combustion engine startup and repeatedly executed at predetermined time intervals.

In this routine, step 100 is performed first to judge whether a startup process is to be performed. More specifically, the ignition switch status and engine speed Ne are determined to judge whether the first process is to be performed after internal combustion engine startup.

If the obtained judgment result indicates that the first process is to be performed after internal combustion engine startup, step 102 is performed to set the valve opening timing of the intake valve 24 to the initial value for the retarded valve opening timing (e.g., 30° CA after TDC) and the valve closing timing of the exhaust valve 26 to the initial value for the retarded valve closing timing (e.g., 43° CA after TDC). If, on the other hand, the obtained judgment result indicates that the first process is already completed after internal combustion engine startup, the routine skips step 102 because it concludes that step 102 is already completed.

Next, step 104 is performed to judge whether the fuel injection amount TAU is not larger than the cold judgment amount TAU1. If the obtained judgment result does not indicate that TAU≦TAU1, it can be concluded that the velocity of the gas inflow to the cylinder needs to be restrained to a certain extent because the internal combustion engine temperature is sufficiently low. In this instance, it can be concluded that the intake valve opening timing IVO needs to be maintained at the initial value for the retarded valve opening timing (30° CA after TDC), and that the exhaust valve closing timing EVC needs to be maintained at the initial value for the retarded valve closing timing (43° CA after TDC). In this case, the requirements are fulfilled when the current routine is promptly terminated.

If, on the other hand, the judgment result obtained in step 104 indicates that TAU<TAU1, it can be concluded that the velocity of the gas inflow to the cylinder can be gradually increased because internal combustion engine warm-up has progressed to a certain extent. In this instance, step 106 is performed to shift the intake valve opening timing IVO in retarding direction by a predetermined width $\theta_1$ while using the retarded valve opening timing convergence value IVOLM (40° CA after TDC) as a limit value. Further, step 108 is performed to shift the exhaust valve closing timing EVC in advancing direction by a predetermined width $\theta_2$ while using the retarded valve closing timing convergence value EVCLM (TDC) as a limit value.

When the above process is performed, the intake valve opening timing IVO and exhaust valve closing timing EVC can be varied as indicated in FIGS. 6D and 6E in accordance with the progress in an internal combustion engine warm-up process. Therefore, the system according to the present embodiment can exercise intake valve retarded opening control without deteriorating the emission characteristic even in a low-temperature environment. As a result, good cold startability and excellent emission characteristic can be both obtained.

Emission characteristic deterioration due to intake valve retarded opening control can be avoided by disabling the intake valve retarded opening control function in a low-temperature environment instead of exercising control as described above. However, when the method according to the present embodiment, that is, the method of exercising intake valve retarded opening control while retarding the exhaust valve closing timing EVC, is used, the exhaust gas can be introduced into the cylinder during an intake stroke. This makes it possible to facilitate the warm-up of the internal combustion engine 10. In this respect, the method according to the present embodiment can produce a better effect than the method of simply disabling the intake valve retarded opening control function in a low-temperature environment.

[Modifications of the First Embodiment, etc.]

The first embodiment, which has been described above, assumes that the intake valve opening timing IVO and exhaust valve closing timing EVC are gradually retarded or advanced in a region where the fuel injection amount TAU is not larger than the cold judgment amount TAU1. However, the method of judging whether the above process should be performed is not limited to the above. More specifically, an alternative is to judge whether the engine temperature Teng is higher than the cold judgment value $T_0$ for the purpose of determining whether or not to retard or advance the intake valve opening timing IVO and exhaust valve closing timing EVC.

The first embodiment, which has been described above, assumes that when TAU<TAU1, the intake valve opening timing IVO and exhaust valve closing timing EVC are retarded or advanced by the predetermined width $\theta_1$ or $\theta_2$. However, the present invention is not limited to the use of the above processing method. For example, an alternative is to prepare a map that defines the relationship between the fuel injection amount TAU or engine temperature Teng and the retarded valve opening timing for the intake valve 24 and the retarded valve closing timing for the exhaust valve 26, reference the map, and perform value setup.

The first embodiment, which has been described above, assumes that there is a fixed relationship between the fuel injection amount TAU and engine temperature Teng, and determines the intake valve opening timing IVO and exhaust valve closing timing EVC in accordance with the fuel injection amount TAU only. However, the present invention is not limited to the use of the above determination method. If a fixed relationship is not maintained between the fuel injection amount TAU and engine temperature Teng, the intake valve opening timing IVO and exhaust valve closing timing EVC may alternatively be determined in accordance with both the fuel injection amount TAU and engine temperature Teng.

In the first embodiment, which has been described above, the retarded valve opening timing initial value for the intake valve 24 and the retarded valve closing timing initial value for the exhaust valve 26 are defined as the valve overlap generation values. However, the present invention is not limited to the use of the above definition. More specifically, the retarded valve closing timing initial value for the exhaust valve 26 is acceptable as far as it is retarded from the standard valve closing timing. It does not always have to generate a valve overlap.

The first embodiment, which has been described above, assumes that solenoid actuators are used to implement the intake adjustment mechanism 30 and exhaust adjustment mechanism 32. However, the present invention is not limited to the use of such a configuration. More specifically, the intake adjustment mechanism 30 and exhaust adjustment mechanism 32 may be any mechanical devices as far as they can vary the valve timings (valve opening timings) of the intake valve 24 and exhaust valve 26.

The first embodiment, which has been described above, exercises retard control over the intake valve opening timing IVO and exhaust valve closing timing EVC during the internal combustion engine warm-up process only. However, the present invention is not limited to such retard control. Retard control is instrumental in reducing the amount of fuel adhesion to the neighborhood of the exhaust valve 26 after completion of warm-up. If the amount of such fuel adhesion needs to be reduced, retard control may be exercised over the intake valve opening timing IVO and exhaust valve closing timing EVC after completion of internal combustion engine warm-up.

The first embodiment, which has been described above, assumes that the velocity of an intake inflow from the intake port to the cylinder is increased by retarding the intake valve opening timing IVO. However, the present invention is not limited to the use of such a method. It is an object of the present invention to reduce the amount of fuel adhesion to the neighborhood of the exhaust valve 26 when the intake flow velocity is increased. The method for increasing the intake flow velocity is not limited to the method of retarding the intake valve opening timing IVO. For example, the intake flow velocity may alternatively be increased by reducing the intake valve lift amount instead of or in addition to retarding the intake valve opening timing IVO.

The above modifications can be applied not only to the first embodiment but also to the second embodiment, which will be described later.

In the first embodiment, which has been described above, the intake adjustment mechanism 30 corresponds to the "intake speed adjustment mechanism" according to the first aspect of the present invention. The "intake speed increase means" according to the first aspect of the present invention and the "intake valve opening timing retard control means" according to the third aspect of the present invention are implemented when the ECU 40 performs steps 100 to 108 to select the retarded valve opening timing as the intake valve opening timing IVO. The "exhaust valve closing timing retard control means" according to the first aspect of the present invention is implemented when the ECU 40 performs steps 100 to 108 to select the retarded valve closing timing as the exhaust valve closing timing EVC.

Further, in the first embodiment, which has been described above, the "intake lift amount control means" according to the fourth aspect of the present invention is implemented when the ECU 40 performs steps 100 to 108 to select a predetermined lift amount for the intake valve 24 instead of selecting the retarded valve opening timing as the intake valve opening timing IVO.

Furthermore, in the first embodiment, which has been described above, the "high-speed state setup means" according to the fifth aspect of the present invention is implemented when the ECU 40 performs step 106. The "retarded valve closing timing setup means" according to the sixth aspect of the present invention is implemented when the ECU 40 performs step 108.

Second Embodiment

A second embodiment of the present invention will now be described with reference to FIGS. 8A, 8B, 9, and 10. The system according to the second embodiment of the present invention can be implemented by adopting the hardware configuration of the first embodiment and allowing the ECU 40 to execute routines shown in FIGS. 9 and 10 instead of the routine shown in FIG. 7.

[Features of the Second Embodiment]

Under predefined operating conditions, the system according to the present embodiment is requested to perform a one-valve-stopped operation during which one of the two exhaust valves 26 provided for each cylinder of the internal combustion engine 10 is stopped. The one-valve-stopped operation is demanded immediately after a cold start of the internal combustion engine 10 or in other similar situations where the internal combustion engine 10 is to be warmed up promptly.

If one of the two exhaust valves 26 is kept closed during an exhaust stroke, the gas burned in a cylinder remains in the cylinder for a longer period than in a situation where the two exhaust valves open. The energy (heat) of the burned gas is likely to be absorbed by the main body of the internal combustion engine 10 when the gas is retained in the cylinder for a long period of time. Therefore, when the one-valve-stopped operation is performed, it is possible to create an environment that is suitable for facilitating the warm-up of the internal combustion engine 10 while reducing the exhaust loss.

Further, if a high-temperature gas is retained within the cylinder for a longer period of time due to the one-valve-stopped operation, the unburned HC contained in the gas is likely to burn in the cylinder. As a result, the quantity of heat generated in the cylinder increases. For these reasons, the one-valve-stopped operation is instrumental in promptly warming up the internal combustion engine immediately after a cold start or in other situations where the internal combustion engine temperature is sufficiently low.

The one-valve-stopped operation is called for during a cold operation during which the fuel does not vaporize well. When intake valve retarded opening control is exercised, the fuel injected into the intake port 12 at a cold start can be promptly atomized. Therefore, the one-valve-stopped operation can be performed to facilitate warm-up immediately after a cold start of the internal combustion engine 10. Further, intake valve retarded opening control can be exercised in order to maintain a stable operation.

In a situation where one of the two exhaust valves 26 is stopped, however, the in-cylinder pressure is more likely to become negative than in a situation where the exhaust valves 26 both open/close. More specifically, while intake valve retarded opening control is exercised, the in-cylinder pressure prevailing when the intake valve 24 opens is likely to become a greater negative pressure value during a one-valve-stopped operation than during a normal operation. Therefore, when intake valve retarded opening control is exercised in conjunction with a one-valve-stopped operation, a large amount of fuel is more likely to adhere to the exhaust valve 26 and its neighborhood than when intake valve retarded opening control is exercised in conjunction with a normal operation.

When intake valve retarded opening control is exercised in conjunction with exhaust valve retard control as is the case with the first embodiment, the phenomenon is more evident particularly in the neighborhood of the stopped exhaust valve 26. In other words, when intake valve retarded opening control is to be exercised, the system according to the first embodiment retards the exhaust valve closing timing so as to generate a valve overlap at least immediately after internal combustion engine startup.

In the above instance, a backward gas flow from the exhaust port 16 to the interior of the cylinder is invoked around an operating exhaust valve 26 when the intake valve 24 opens. The backward gas flow inhibits the fuel from adhering to the exhaust valve 26 and its neighborhood. Even when such a retarded valve closing timing is set, no backward gas flow occurs around the exhaust valve 26 if it is stopped. In such an instance, there is no factor that blocks the arrival of the fuel. Therefore, a large amount of fuel that flows inward from the intake port 12 can adhere to the stopped exhaust valve 26 and its neighborhood.

As described above, when a one-valve-stopped operation is performed in conjunction with intake valve retarded opening control, the fuel is likely to adhere to the exhaust valve 26 and its neighborhood, and particularly to the stopped exhaust valve 26 and its neighborhood. Therefore, if a one-valve-stopped operation is merely performed in conjunction with intake valve retarded opening control immediately after a cold start of the internal combustion engine 10, the emission characteristic readily deteriorates.

Figure 8A:
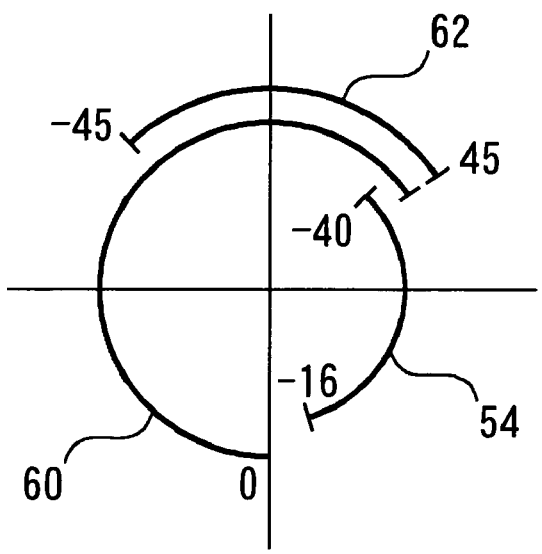
FIGS. 8A and 8B illustrate the principle of a method that a second embodiment of the present invention uses to avoid emission characteristic deterioration while exercising the combination of a one-valve-stopped operation function and intake valve retarded opening control function.
Figure 8B:
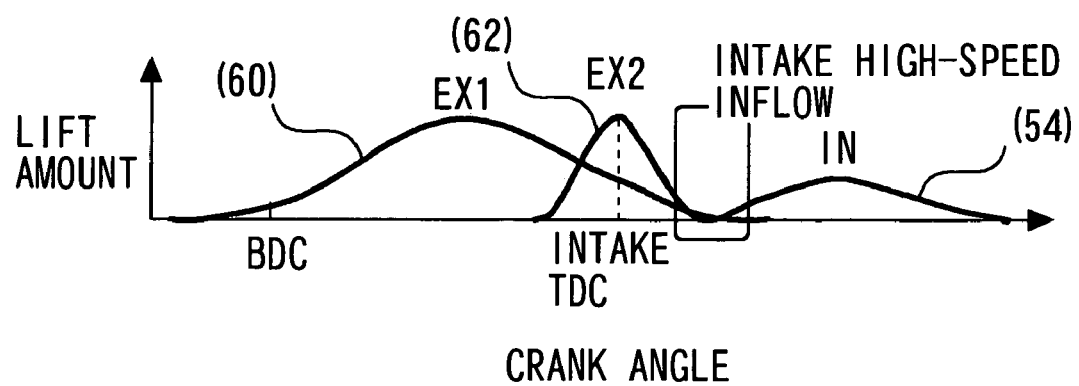

FIGS. 8A and 8B illustrate the principle of a method that the present embodiment uses to avoid emission characteristic deterioration. More specifically, FIG. 8A simultaneously shows the retarded valve opening period 54 for the intake valve 24, which is used during intake valve retarded opening control, a first retarded valve opening period 60 to be applied to one exhaust valve 26, and a second retarded valve opening period 62 to be applied to the other exhaust valve 26. FIG. 8B shows the lift amount for the intake valve 24 and the lift amounts for the two exhaust valves 26, which correspond to the valve opening periods shown in FIG. 8A.

The first retarded valve opening period 60 is set under the same idea as for the 40° CA retarded valve opening period that is used in the first embodiment. According to the first retarded valve opening period 60, the exhaust valve 26 is open between exhaust BDC and 45° CA after exhaust TDC. When such a valve closing timing EVC is used, a 5° CA valve overlap can be generated for the retarded valve opening period 54 for the intake valve 24 so that fuel adhesion can be effectively prevented from occurring in the neighborhood of the exhaust valve 26 that uses the valve closing timing EVC.

According to the second retarded valve opening period 62, the exhaust valve 26 remains closed until the crank angle is approximately 45° CA before exhaust TDC, and then remains open until the crank angle is approximately 45° CA after exhaust TDC. The valve closing timing EVC for the second retarded valve opening period 62 is the same as for the first retarded valve opening period 60. Therefore, the use of the second retarded valve opening period 62 also makes it possible to generate a 5° CA valve overlap and effectively inhibit the fuel from adhering to the neighborhood of the exhaust valve 26.

When one exhaust valve 26 is driven with the first retarded valve opening period 60 applied and the other exhaust valve 26 is driven with the second retarded valve opening period 62 applied, it is possible to create a situation that is similar to a situation where only one exhaust valve 26 is open with the other stopped during the time interval between exhaust BDC and 45° CA before exhaust TDC. When one exhaust valve 26 remains closed during the above-mentioned period, the main body of the internal combustion engine 10 can efficiently absorb the energy of a burned gas. Further, the unburned HC can be efficiently burned in the cylinder.

Therefore, when the intake valve 24 and exhaust valves 26 are driven in accordance with the valve opening periods shown in FIGS. 8A and 8B, it is possible to exercise intake valve retarded opening control in conjunction with a one-valve-stopped operation without deteriorating the emission characteristic in a low-temperature environment. When such an operation is carried out, it is possible to facilitate the progress of warm-up while steadily operating the internal combustion engine 10 during its warm-up process.

[Details of a Process According to the Second Embodiment]

Figure 9:
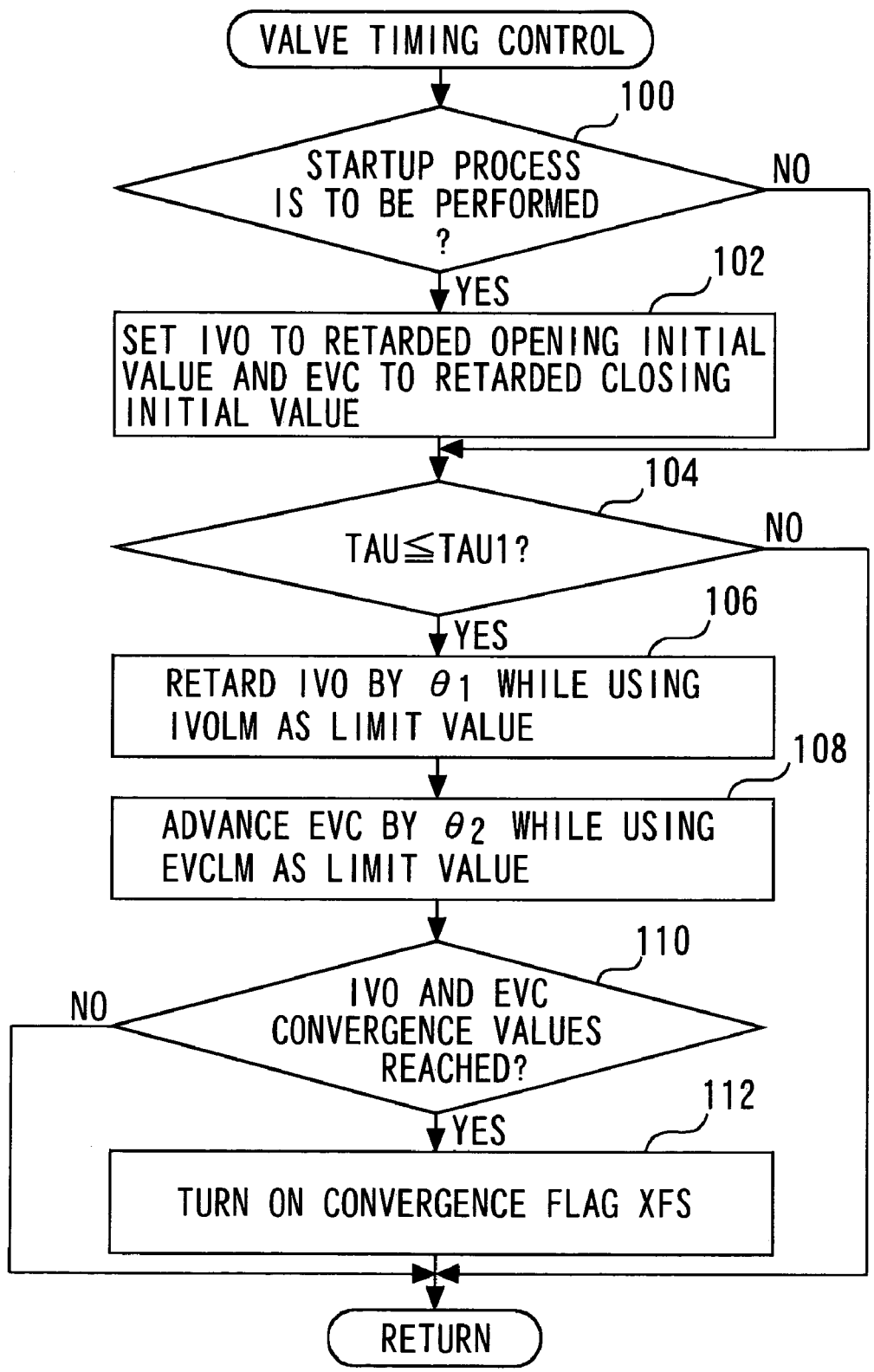
FIG. 9 is a flowchart illustrating a routine that the second embodiment of the present invention executes to set an intake valve opening timing IVO and an exhaust valve closing timing EVC.

The functions described above can be implemented when the ECU 40 executes the routine shown in FIG. 9 and the routine shown in FIG. 10. FIG. 9 is a flowchart illustrating a routine that the ECU 40 executes to set the intake valve opening timing IVO and exhaust valve closing timing EVC. The routine shown in FIG. 9 is similar to the routine shown in FIG. 7 except that steps 110 and 112 are additionally performed after step 108.

In the routine shown in FIG. 9, after steps 106 and 108 are performed in accordance with the progress in internal combustion engine warm-up, step 110 is performed to judge whether the intake valve opening timing IVO and exhaust valve closing timing EVC have respectively reached their convergence values IVOLM, EVCLM. If the query in step 110 is answered "Yes," step 112 is performed to turn ON a convergence flag XFS.

Therefore, the ECU 40 according to the present embodiment can observe the status of the convergence flag XFS to judge whether intake valve retarded opening control needs to be exercised with the velocity of the gas inflow to the cylinder restrained, or judge whether such flow velocity restraint is no longer needed. In other words, the ECU 40 according to the present embodiment can observe the status of the convergence flag XFS to judge whether it is necessary to prevent the fuel from adhering to the exhaust valve 26 and its neighborhood, or judge whether it is no longer necessary to avoid such fuel adhesion.

FIG. 10 is a flowchart illustrating a routine that the ECU 40 executes to change the method for operating the exhaust valve 26. In this routine, step 120 is performed first to judge whether the execution condition for a one-valve-stopped operation is established. The judgment is formulated in accordance, for instance, with the engine temperature Teng.

If the obtained judgment result indicates that the execution condition for a one-valve-stopped operation is not established, step 122 is performed to exercise standard control over the two exhaust valves 26. In "standard control," the exhaust valves 26 are driven so that they are closed during the valve closing timing EVC, which is determined by the routine shown in FIG. 9, after they are opened for a predetermined standard period (e.g., 225° CA). After completion of step 122, the internal combustion engine 10 operates in the same manner as described in conjunction with the first embodiment.

If the judgment result obtained in step 120 indicates that the execution condition for a one-valve-stopped operation is established, step 124 is performed to judge whether the convergence flag XFS is still OFF. If the obtained judgment result indicates that the convergence flag XFS is OFF, it can be concluded that it is still necessary to avoid fuel adhesion to the exhaust valves 26. In this instance, step 126 is performed to exercise standard control over one exhaust valve 26 and valve opening retard control over the other exhaust valve 26.

"Valve opening retard control" is exercised to keep the exhaust valve 26 open for a time interval between a predetermined crank angle immediately before exhaust TDC and the valve closing timing EVC determined by the routine shown in FIG. 9. If, for instance, the valve closing timing EVC is 45° CA after TDC, valve opening retard control is exercised so that the exhaust valve 26 operates in accordance with the second valve opening period 62 shown in FIGS. 8A and 8B.

When step 126 is performed as described above, an operation similar to the one-valve-stopped operation can be subsequently performed in a low-temperature environment while avoiding fuel adhesion to the two exhaust valves 26. As a result, the internal combustion engine 10 can be efficiently warmed up while conducting a stable cold operation.

If the judgment result obtained in step 124 does not indicate that the convergence flag XFS is OFF, it can be concluded that it is no longer necessary to avoid fuel adhesion to the exhaust valves 26. In this instance, step 128 is performed to exercise standard control over one exhaust valve 26 and stop control over the other exhaust valve 26. "Stop control" is exercised to ensure that the exhaust valve 26 is stopped at all times. Therefore, when step 128 is performed, a normal one-valve-stopped operation is conducted subsequently. In this case, fuel adhesion to the exhaust valve 26 does not deteriorate the emission characteristic at all. Therefore, the one-valve-stopped operation can be continuously performed without suffering any inconvenience.

As described above, the routines shown in FIGS. 9 and 10 make it possible to selectively perform the operation described in conjunction with the first embodiment, the operation in which the valve opening timing for one exhaust valve 26 is retarded, or the normal one-valve-stopped operation. Further, the system according to the present embodiment can maintain an excellent emission characteristic at all times, conduct a stable cold operation, and efficiently progress the warm-up process for the internal combustion engine 10 by selectively performing the above operations.

The second embodiment, which has been described above, separately judges the establishment condition for the onevalve-stopped operation and the setup condition for the convergence flag XFS. However, the present invention is not limited to the use of such a judgment method. The above conditions are both established when the internal combustion engine 10 is warmed to a certain extent. Therefore, the above conditions may be considered to be identical with each other. More specifically, an alternative is to perform step 120 in the routine shown in FIG. 10 to judge whether the convergence flag XFS is OFF, and delete steps 124 and 128.

The second embodiment, which has been described above, sets the retarded valve opening timing initial value for the intake valve 24 and the retarded valve closing timing initial value for the exhaust valve 26 in such a manner as to generate a valve overlap. However, such initial value setup need not always be performed so as to generate a valve overlap as is the case with the first embodiment.

In the second embodiment, which has been described above, solenoid actuators are used to implement the intake adjustment mechanism 30 and exhaust adjustment mechanism 32. However, the present invention is not limited to the use of such a configuration. More specifically, the intake adjustment mechanism 30 may be any mechanical device as far as it is capable of varying the valve timing (valve opening timing) for the intake valve 24. The exhaust adjustment mechanism 32 may be any mechanical device as far as it is capable of varying the valve timings of the exhaust valves 26 on an individual basis.

When a one-valve-stopped operation and intake valve retarded opening control operation are simultaneously requested, the second embodiment, which has been described above, opens one exhaust valve 26 after it is closed with a delay. However, such exhaust valve control need not always be exercised in conjunction with intake valve retarded opening control. If the fuel adheres to the neighborhood of the stopped exhaust valve 26 during a one-valve-stopped operation, the exhaust valve 26 may open with a delay even when intake valve retarded opening control is not exercised.

In the second embodiment, which has been described above, the "partial stop request judgment means" according to the eighth aspect of the present invention is implemented when the ECU 40 performs step 120; and the "exhaust valve control means" according to the eighth aspect of the present invention is implemented when the ECU 40 performs step 126.

The invention claimed is:

1. A valve timing control device comprising:
a fuel injection valve for injecting fuel into an intake port in an internal combustion engine;
an intake speed adjustment mechanism for varying the speed of an intake inflow from the intake port to a cylinder;
an exhaust adjustment mechanism for varying the valve timing of an exhaust valve;
intake speed increase means for exercising control so as to place the intake speed adjustment mechanism in a high-speed state for raising the speed of an intake inflow; and
exhaust valve closing timing retard control means for exercising control so that an exhaust valve closing timing coincides with a retarded valve closing timing, which is retarded from a normal valve closing timing, in a situation where the intake speed adjustment mechanism is maintained in the high-speed state.

2. The valve timing control device according to claim 1, wherein the intake speed increase means exercises control so as to place the intake speed adjustment mechanism in the high-speed state in a situation where the internal combustion is not completely warmed up;
wherein the normal valve closing timing is an exhaust valve closing timing that is normally used after the internal combustion engine is warmed up; and
wherein the exhaust valve closing timing retard control means exercises control so that the exhaust valve closing timing coincides with the retarded valve closing timing in a situation where the internal combustion engine is not completely warmed up and the intake speed adjustment mechanism is maintained in the high-speed state.

3. The valve timing control device according to claim 1, wherein the intake speed adjustment mechanism includes an intake adjustment mechanism for varying the valve timing of an intake valve; and
wherein the intake speed increase means includes intake valve opening timing retard control means, which raises the speed of an intake inflow by exercising control so that an intake valve opening timing coincides with a retarded valve opening timing after an exhaust top dead center.

4. The valve timing control device according to claim 3, wherein the retarded valve opening timing and the retarded valve closing timing are such that an overlap is generated between intake valve opening period and exhaust valve opening period.

5. The valve timing control device according to claim 1, wherein the intake speed adjustment mechanism includes an intake adjustment mechanism for varying the lift amount for the intake valve; and
wherein the intake speed increase means includes intake lift amount control means, which raises the speed of an intake inflow by reducing the lift amount for the intake valve.

6. The valve timing control device according to claim 1, wherein the intake speed increase means includes high-speed state setup means, which varies the high-speed state so as to increase the speed of an intake inflow when a warm-up process for the internal combustion engine progresses.

7. The valve timing control device according to claim 1, further comprising:
retarded valve closing timing setup means, which varies the retarded valve closing timing in advancing direction when the warm-up process for the internal combustion engine progresses.

8. The valve timing control device according to claim 1, wherein the internal combustion engine includes a plurality of exhaust valves for each cylinder; and
wherein the exhaust adjustment mechanism has a function for adjusting valve timings of the plurality of exhaust valves for each cylinder on an individual basis,
said valve timing control device comprising:
partial stop request judgment means for judging whether a request for stopping some of the plurality of exhaust valves is generated, and
exhaust valve control means, which, when the stop request is recognized in a situation where the intake speed adjustment mechanism is maintained in the high-speed state, operates all the exhaust valves while ensuring that the valve timings for some exhaust valves are retarded from the valve timings for the other exhaust valves.

* * * * *